Aug. 8, 1939.  J. W. MARSH  2,168,359
POWER TRANSMISSION GEAR
Filed Oct. 20, 1936  2 Sheets-Sheet 1
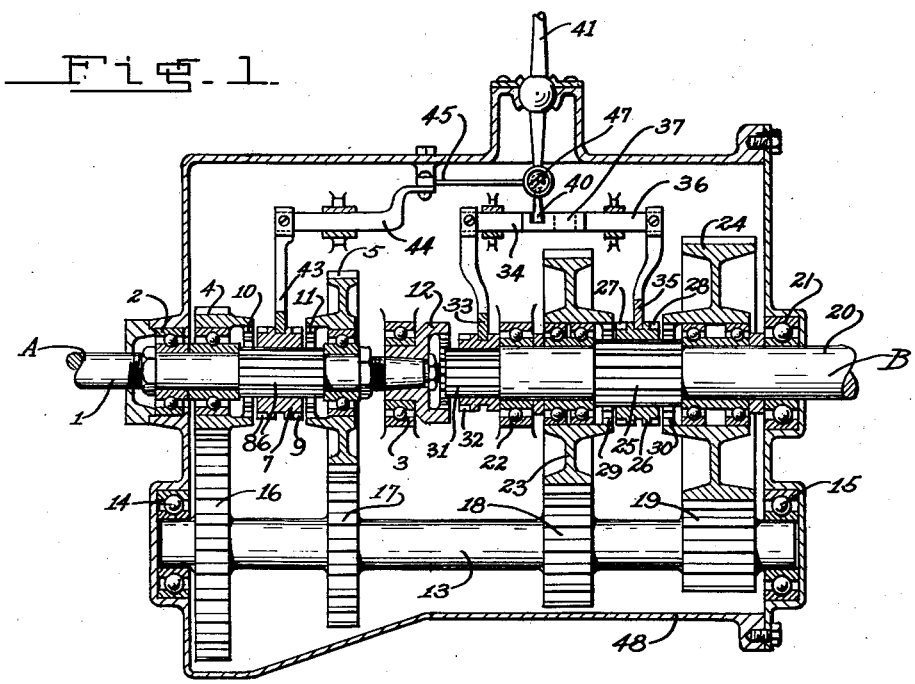
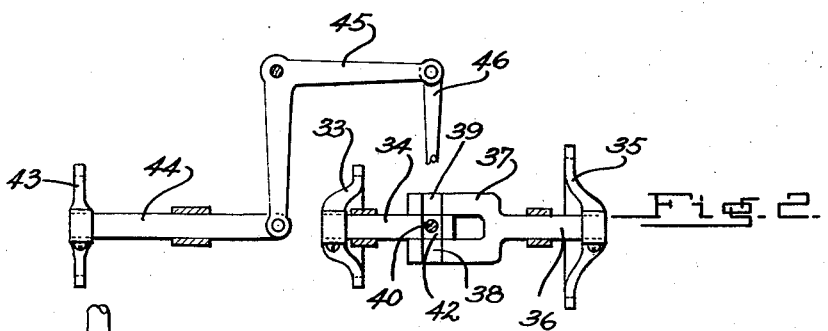
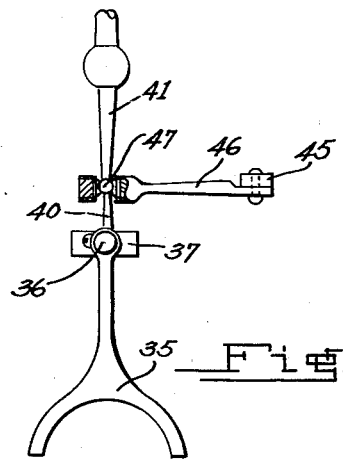
John W. Marsh
INVENTOR.
BY Adam Richmond
ATTORNEYS.

Aug. 8, 1939.   J. W. MARSH   2,168,359
POWER TRANSMISSION GEAR
Filed Oct. 20, 1936   2 Sheets-Sheet 2

John W. Marsh
INVENTOR.
BY Adam Richmond
ATTORNEYS.

Patented Aug. 8, 1939

2,168,359

UNITED STATES PATENT OFFICE 2,168,359

POWER-TRANSMISSION GEAR

John W. Marsh, Washington, D. C.

Application October 20, 1936, Serial No. 106,573

4 Claims. (Cl. 74—375)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to a power transmission gearing and particularly to an improvement in multispeed transmission for vehicles.

An object of this invention is to provide a "through" drive whereby the torque of the input shaft is transmitted directly to the output shaft without the drag of rotating gears.

A further object of this invention is to provide a wide range of speed ratios with a single control.

With these and other objects in view this invention consists in the combination, arrangement and construction hereinafter described, claimed and illustrated in the accompanying drawings where like parts carry like characters of reference throughout the several views.

Figure 4:
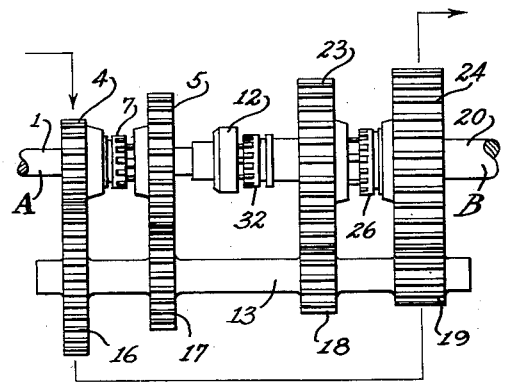
Figure 5:
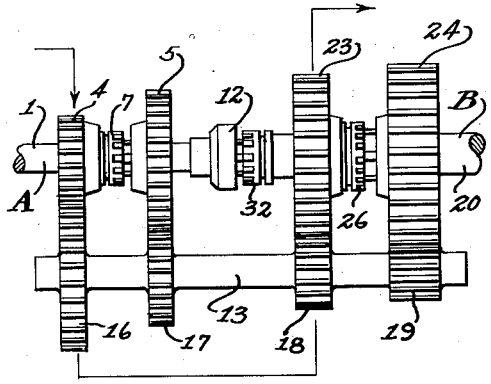
Figure 6:
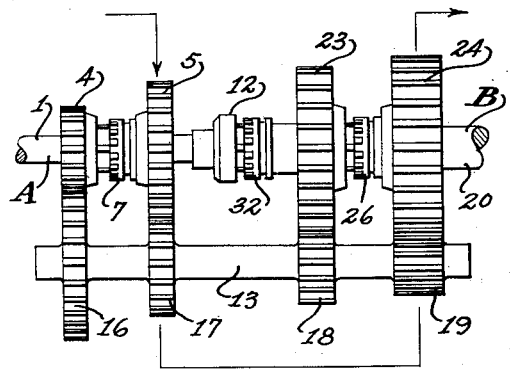
Figure 7:
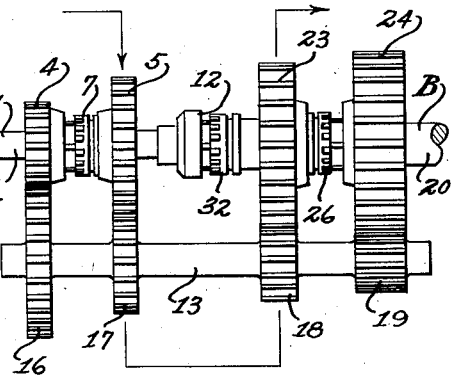
Figure 8:
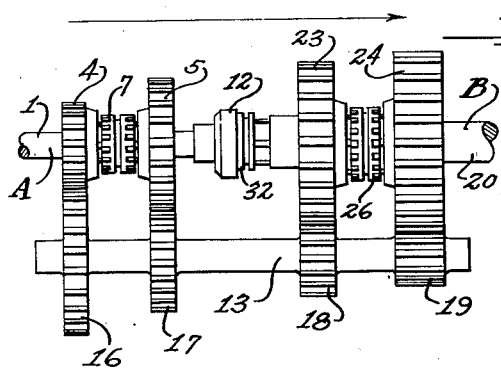

In the accompanying drawings Fig. 1 shows a vertical central sectional view through this improved transmission in its disengaged or neutral position. Fig. 2 shows a vertical plan view of the shifting mechanism. Fig. 3 shows an end view of the shifting mechanism. Fig. 4 shows the gear train engaged in the first or lowest gear. Fig. 5 shows the gear train engaged in the second gear. Fig. 6 shows the gear train engaged in the third gear. Fig. 7 shows the gear train engaged in the fourth gear. Fig. 8 shows the gear train engaged in direct drive.

Referring to the drawings and particularly to Fig. 1, rotation of the driving shaft is transmitted to shaft 1 suitably supported in bearings 2 and 3 and having rotatably mounted thereon gears 4 and 5. The portion 6 of shaft 1 is splined, and slidably mounted thereon is a collar 7 having formed on its periphery and faces series of teeth 8 and 9 capable of engagement with adjacent teeth 10 and 11 formed on gears 4 and 5. A clutch portion 12 is mounted on shaft 1 on the end opposite to that at which power is applied at A.

A countershaft 13 is suitably supported in bearings 14 and 15 and has secured thereto gears 16, 17, 18 and 19 meshing with gears 4, 5, 23 and 24.

A driven shaft 20 is suitably supported in bearings 21 and 22 and has rotatably mounted thereon gears 23 and 24. The portion 25 of shaft 20 is splined, and slidably mounted thereon is a collar 26 having formed on its periphery and faces series of teeth 27 and 28 capable of engagement with adjacent teeth 29 and 30 formed on gears 23 and 24. The end 31 of shaft 20 opposite to that at which power is transmitted at B is splined and has slidably mounted thereon clutch portion 32 capable of engagement with clutch portion 12 on shaft 1.

The shifting arm 33 engages clutch portion 32 in the conventional manner. Shifting arm 33 is controlled by shifting rod 34 actuated by shifting lever 41 when the end 40 of shifting lever 41 is in engagement with notch 42 of control rod 34.

The shifting arm 35 engages collar 26 in the conventional manner. Shifting arm 35 is controlled by shifting rod 36 having a bifurcated end 37 provided with notches 38 and 39 for engagement with end 40 of shifting lever 41.

The shifting arm 43 engages collar 7 in the conventional manner. Shifting arm 43 is controlled by shifting rod 44 through bell crank 45 and tie rod 46 by portion 47 of shifting lever 41.

The mechanism is contained and supported in suitable housing 48.

Referring to Fig. 1 it will be observed that collar 7 being disengaged from its adjacent gears 4 and 5, shaft 1 is free to rotate in its bearings and in the gears 4 and 5. Movement of the shifting lever 41 transversely of the shafts and to the near side of the case operates collar 7 through parts 46, 45, 44 and 43 engaging the teeth 8 with teeth 10 on gear 4, thus securing gear 4 to shaft 1. In this position the end 40 of shifting lever 41 is engaged with notch 38 in the bifurcated end 37 of shifting rod 36. Further movement of the shifting lever 41 longitudinally of the shafts and towards the end B operates shifting rod 36 and shifting arm 35, sliding collar 26 on the splined portion 25 of shaft 20 engaging teeth 28 on collar 26 with teeth 30 on gear 24, thus securing gear 24 to shaft 20.

This position is shown in Fig. 4 wherein power is transmitted from gear 4 to gear 16 through countershaft 13 to gear 19 and from gear 19 to gear 24. This arrangement provides the greatest speed reduction and consequent multiplication of power between shaft 1 and shaft 20.

With further reference to the drawings and with particular reference to Fig. 2, it will be observed that with the shifting lever towards the near side of the case and the collar 7 engaged with gear 4, movement of the shifting lever longitudinally of the shafts and towards end A disengages collar 26 from gear 24 and engages collar 26 with gear 23, thus securing gear 23 to shaft 20. This position is shown in Fig. 5 wherein power is transmitted from gear 4 to gear 16 through shaft 13 to gear 18 and from gear 18 to gear 23. This arrangement provides the second speed reduction between shaft 1 and shaft 20.

Referring again to Fig. 2 movement of the shifting lever to a neutral longitudinal position disengages collar 26 from gears 23 and 24, in which position the transverse movement of the lever is made to the near side of the case, sliding collar 7 out of engagement with gear 4 and into engagement with gear 5. In this position the end 40 of shifting lever 41 is engaged with notch 39 in the bifurcated end 37 of shifting rod 36. Further movement of the shifting lever longitudinally of the shafts towards end B operates shifting rod 36 and engages collar 26 with gear 24, thus securing gear 24 to shaft 20. This position is shown in Fig. 6 wherein power is transmitted from gear 5 to gear 17 through countershaft 13 to gear 19 and from gear 19 to gear 24. This arrangement provides the third speed reduction between shaft 1 and shaft 20.

With further reference to Fig. 2 it will be observed that with the shifting lever towards the far side of the case and the collar 7 engaged with gear 5, movement of the shifting lever longitudinally of the shafts and towards end A disengages collar 26 from gear 24 and engages collar 26 with gear 23, thus securing gear 23 to shaft 20. This position is shown in Fig. 7 wherein power is transmitted from gear 5 to gear 17 through countershaft 13 to gear 18 and from gear 18 to gear 23. This arrangement provides the fourth speed reduction between shaft 1 and shaft 20.

Referring again to Fig. 2 movement of the shifting lever to a neutral longitudinal position disengages collar 26 from gears 23 and 24, and movement of the shifting lever to the neutral transverse position disengages collar 7 from gears 4 and 5. In this position the end 40 of the shifting lever 41 is engaged with notch 42 in shifting rod 34. Movement of the shifting lever longitudinally with the shafts towards end A slides clutch portion 32 into engagement with clutch portion 12, thus securing shaft 1 to shaft 20, both shafts being free to rotate within the gears 4, 5, 23 and 24. This position is shown in Fig. 8 wherein power is transmitted from shaft 1 directly to shaft 20 providing a direct drive without the rotation of any gears.

While the drawings do not show an interlock to prevent the simultaneous engagement of collar 26 and clutch portion 32, it is evident that such interlock can be incorporated in the conventional manner. It is also apparent that synchronizing mechanism may be incorporated with collars 7 and 26 and with clutch portions 12 and 32.

Having described my invention, what I claim as new and wish to secure by Letters Patent is:

1. A transmission mechanism comprising an output shaft, having a plurality of gears of different diameters rotatably mounted thereon, a countershaft having gears fixed thereto, an input shaft axially aligned with said output shaft and having a plurality of gears of different diameters rotatably mounted thereon, said output shaft gears and said input shaft gears being in mesh with said countershaft gears, a clutch mechanism mounted on the adjacent ends of said output and said input shafts, means for independently clutching said output shaft gears to said output shaft, means for independently clutching said input shaft gears to said input shaft, and means for independently engaging said clutch mechanism between said output and said input shafts without clutching said input shaft gears or said output shaft gears to their respective shafts, all means of engaging such gears and clutch mechanism being actuated by a single control.

2. A transmission mechanism comprising a driving shaft and a driven shaft each having a plurality of gears of different diameters rotatably mounted thereon, a countershaft having gears fixed thereto, said driving and driven shaft gears being in mesh with said countershaft gears, means for independently connecting said driving and driven shaft gears to their respective shafts and a single operating means for controlling all of said means.

3. A transmission mechanism comprising a driving shaft and a driven shaft each having a plurality of gears of different diameters rotatably mounted thereon, a countershaft having gears fixed thereto, said driving and driven shaft gears being in mesh with said countershaft gears, means for selectively connecting said driving and driven shaft gears to their respective shafts and a single operating means for controlling all of said means.

4. A transmission mechanism comprising a driving shaft having gears rotatably mounted thereon, a driven shaft having a plurality of gears of different diameters rotatably mounted thereon axially aligned with said driving shaft, a countershaft having gears fixed thereto, said driving and driven shaft gears being in mesh with said countershaft gears, clutch devices mounted on the adjacent ends of said driving and driven shafts, clutch devices mounted adjacent the gears on said driving and driven shafts and a common means for independently and selectively operating said clutch devices.

JOHN W. MARSH.